(12) United States Patent
Blanke

(10) Patent No.: US 11,289,895 B2
(45) Date of Patent: Mar. 29, 2022

(54) MULTI-STAGE PROTECTION DEVICE FOR THE OVERCURRENT- AND OVERVOLTAGE-PROTECTED TRANSFER OF ELECTRICAL ENERGY

(71) Applicant: Phoenix Contact GmbH & Co. KG, Blomberg (DE)

(72) Inventor: Jörg Blanke, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 16/973,089

(22) PCT Filed: May 22, 2019

(86) PCT No.: PCT/EP2019/063234
§ 371 (c)(1),
(2) Date: Dec. 8, 2020

(87) PCT Pub. No.: WO2019/238369
PCT Pub. Date: Dec. 19, 2019

(65) Prior Publication Data
US 2021/0257827 A1    Aug. 19, 2021

(30) Foreign Application Priority Data
Jun. 13, 2018  (BE) .................... 2018/5391

(51) Int. Cl.
*H02H 3/10* (2006.01)
*H02H 1/00* (2006.01)

(52) U.S. Cl.
CPC ............ *H02H 3/10* (2013.01); *H02H 1/0007* (2013.01)

(58) Field of Classification Search
CPC ............ H01H 2085/466; H01H 83/20; H01H 85/0241; H01H 85/46; H01H 85/463;
(Continued)

(56) References Cited

U.S. PATENT DOCUMENTS 4,520,419 A    5/1985  Locher et al.
9,401,593 B2   7/2016  Gascuel
(Continued)

FOREIGN PATENT DOCUMENTS

FR         2382789 A1     9/1978
JP     H 04-334925 A    11/1992
(Continued)

OTHER PUBLICATIONS

Notice of Reasons for Refusal; Japanese Patent Application No. 2020-567580; Reiwa 4(2022) dated Jan. 13; Patent Examiner MIGITA, Katsunori 9173 5TOO; Patent Business Corporation YKI International Patent Office; Article 29 (1) (iii) (Novelty) Article 29 (2) (Inventive Step); 5 pgs.

*Primary Examiner* — Jared Fureman
*Assistant Examiner* — Nicolas Bellido
(74) *Attorney, Agent, or Firm* — Holland & Hart LLP

(57) ABSTRACT

A protective device includes a first fuse circuit, an overvoltage protection circuit, and a second fuse circuit. The first fuse circuit interrupts a flow of a line current from a voltage terminal to the electrical load when an intensity of the line current reaches a first current intensity limit value. The overvoltage protection circuit electrically connects poles of the voltage terminal when a first voltage limit value of a voltage is reached on the first fuse circuit to force the line current to reach the first current intensity limit value. The second fuse circuit activates the overvoltage protection circuit when a second voltage limit value of a voltage on the second fuse circuit is reached to electrically connect the poles of the voltage terminal. The second voltage limit value is based at least in part on a nominal voltage of the electrical load.

17 Claims, 3 Drawing Sheets

(58) Field of Classification Search
CPC .... H02H 1/0007; H02H 1/0038; H02H 3/023;
H02H 3/027; H02H 3/033; H02H 3/08;
H02H 3/087; H02H 3/10; H02H 3/20;
H02H 3/202; H02H 3/22; H02H 5/041;
H02H 5/046; H02H 7/1213; H02H
7/1252; H02H 9/02; H02H 9/04; H02H
9/041; H02H 9/042; H02M 1/32; H03K
17/0828

See application file for complete search history.

(56) References Cited

U.S. PATENT DOCUMENTS

| | | | | |
|---|---|---|---|---|
| 2004/0027754 A1* | 2/2004 | Freyman | ............... | H04M 3/18 |
| | | | | 361/91.1 |
| 2007/0103834 A1* | 5/2007 | Huang | ............... | H02J 7/0031 |
| | | | | 361/104 |
| 2010/0188785 A1* | 7/2010 | Gascuel | ............... | H02H 3/033 |
| | | | | 361/18 |
| 2021/0249851 A1* | 8/2021 | Hackl | ............... | H02H 5/046 |

FOREIGN PATENT DOCUMENTS

| | | | | | |
|---|---|---|---|---|---|
| JP | 2000-201429 A | | 7/2000 | | |
| JP | 2007-043822 A | | 2/2007 | | |
| JP | 2007043822 A | * | 2/2007 | ............ | H02H 3/023 |
| JP | 2013-099031 A | | 5/2013 | | |

\* cited by examiner

MULTI-STAGE PROTECTION DEVICE FOR THE OVERCURRENT- AND OVERVOLTAGE-PROTECTED TRANSFER OF ELECTRICAL ENERGY

CROSS-REFERENCE TO RELATED APPLICATIONS

The present application is the national phase entry under 35 U.S.C. 371 of International Patent Application No. PCT/EP2019/063234 by Blanke, entitled "MULTI-STAGE PROTECTION DEVICE FOR THE OVERCURRENT- AND OVERVOLTAGE-PROTECTED TRANSFER OF ELECTRICAL ENERGY," filed May 22, 2019; and claims the benefit of Belgian Patent Application No. BE2018/5391 by Blanke, entitled "MEHRSTUFIGE SCHUTZVORRICHTUNG ZUR ÜBERSTROM-UND ÜBERSPANNUNGSGESCHÜTZTEN ÜBERTRAGUNG VON ELEKTRISCHER ENERGIE," filed Jun. 13, 2018, each of which is assigned to the assignee hereof and is incorporated by reference in its entirety.

FIELD OF THE DISCLOSURE

The present disclosure relates to a protective device for the overcurrent and overvoltage-protected transmission of electrical energy from a voltage terminal to an electrical load.

BACKGROUND

Protective devices for limiting a current intensity, a voltage and/or a power are usually used in isolation amplifiers in order to protect downstream electrical components from current intensities, voltages and/or powers above a respectively predetermined limit value. Correspondingly, the maximum rated data of electrical components which are connected downstream of the protective device can advantageously be reduced. The protective device can also be used to safely disconnect an electrical load from the voltage terminal in order to meet the requirements of explosion protection.

The protective device typically has an overcurrent protective device and an overvoltage protective device connected downstream of the overcurrent protective device. The overvoltage protection can short-circuit the voltage when a voltage limit value is reached, so that a short-circuit current flows through the overcurrent fuse, which can subsequently be triggered when a current intensity limit value is reached in order to interrupt the flow of current. Disadvantageously, it may be necessary to dimension the downstream electrical components according to the current intensity limit value and/or according to the voltage limit value. Accordingly, the electrical components can have increased component dimensions and increased nominal currents intensity and/or increased rated voltages that are not necessary for operation below the current intensity and/or voltage limit value.

SUMMARY

It is the object of the present disclosure to provide a more efficient protective device which enables electrical components to be connected downstream of the protective device, which components can be adapted for different nominal voltages.

This object is achieved by the features of the independent claim. Advantageous implementations are the subject matter of the dependent claims, the description and the accompanying figures.

The present disclosure is based on the knowledge that the above object can be achieved by a protective device which, in addition to a first overcurrent and overvoltage fuse, comprises an additional, second overcurrent and/or overvoltage fuse. In particular, a second fuse can be connected downstream of a first fuse wherein said second fuse trips at a lower rated current intensity than the first fuse. As a result, the electrical load can also be protected from overcurrents, which are smaller than the short-circuit current caused by the overvoltage device. The first overvoltage protective device and the additional overcurrent protective device can be a clamping circuit which can be tripped by two separate voltage limit value switches, in particular different sized Z-diodes.

According to a first aspect, the disclosure relates to a protective device for the overcurrent and overvoltage protected transmission of electrical energy from a voltage terminal to an electrical load, wherein the voltage terminal has two poles. The protective device comprises a first fuse circuit which is adapted to interrupt the flow of a line current from the voltage terminal to the electrical load when said line current reaches a first current intensity limit value. Furthermore, the protective device comprises an overvoltage protection circuit, which is connected downstream of the first fuse circuit and upstream of the electrical load. The overvoltage protection circuit is adapted to connect the poles of the voltage terminal in an electrically conductive manner when a first voltage limit value of a voltage is reached on the first fuse circuit, in particular to connect or short-circuit them with low resistance in order to force a line current that reaches the first current intensity limit value and thus to trip the first fuse circuit. Furthermore, the protective device comprises a second fuse circuit, which is connected downstream of the overvoltage protection circuit and upstream of the electrical load. The second fuse circuit is adapted to activate the overvoltage protection circuit when a second voltage limit value of a voltage at the second fuse circuit is reached in order to connect the poles of the voltage terminal in an electrically conductive manner. The second voltage limit value can be determined in dependence of a nominal voltage of the electrical load. Furthermore, the second voltage limit value can be dependent on a nominal power consumption and/or a nominal current consumption of the load.

The respective voltage at the respective fuse circuit can be tapped at a node of the respective fuse circuit with which the respective load is electrically connected.

The voltage terminal of the protective device can in particular be formed by a circuit which is supplied with electrical energy from an energy supply network and is connected upstream of the first fuse circuit and supplies it with electrical energy. This intermediate stage can be, for example, a switched-mode power supply and/or a voltage converter.

The second current intensity limit value can be smaller than the first current intensity limit value. In particular, if a voltage transformation of the voltage of the voltage terminal is not provided between the first fuse circuit and the second fuse circuit, electrical loads connected downstream of the second fuse circuit can have lower current intensity limit values and can be manufactured correspondingly more cost-effectively and/or smaller.

Furthermore, a voltage transformer, which is adapted to increase or decrease the voltage of the voltage terminal, can be arranged between the first fuse circuit and the second fuse circuit. The voltage transformer can, for example, be adapted to reduce a voltage from 24 V to 5 V. Electrical loads connected downstream of the second fuse circuit can be adapted for a higher current intensity than the first fuse circuit, so that the second current intensity limit value can be greater than the first current intensity limit value. The second voltage limit value can also be smaller or larger than the first voltage limit value.

Accordingly, the second fuse circuit can trip the overvoltage protection circuit in the event of a malfunction, in particular an overvoltage of a switching stage which is connected upstream of the second fuse circuit.

The protective device can be a combination of an overcurrent fuse and a clamping circuit (crowbar), with which an electrical load can be secured against the flow of an electrical current with a current intensity above a current intensity permissible for the electrical load and/or the presence of a voltage above a voltage permissible for the electrical load. In particular, a maximum electrical power which the load can convert can also be defined in combination with the limitation of the current intensity and the voltage.

Furthermore, the protective device can be arranged, for example, in a signal input of an isolation amplifier in order to be able to reduce the maximum rated data of downstream electrical components. Furthermore, the protective device can form explosion protection in order to enable the downstream electrical components to be operated in a potentially explosive environment and/or atmosphere.

The protective device can be connected downstream of an energy feed of an electrical load in order to be able to expect predetermined current intensity, voltage and/or power values downstream of the protective device. Correspondingly, electronic circuits connected downstream of the protective device can have smaller air and/or creepage distances, since a reduced voltage level can be expected.

With the arrangement of a second fuse circuit downstream of the first fuse circuit, in particular the advantage can be achieved that the clearances and creepage distances can be significantly reduced compared to a single-stage safety arrangement, since the voltages to be expected can be lower. The second security circuit can be implemented as a chip fuse which has reduced component dimensions compared to the first security circuit. Furthermore, electrical components which are connected downstream of the second fuse circuit can have reduced component dimensions and/or reduced performance data compared to an arrangement downstream of the first fuse circuit.

In one example, the overvoltage protection circuit is adapted to interrupt the electrically conductive connection between the poles of the voltage terminal when the line current flowing through the overvoltage protection circuit falls below a minimum level. This has the advantage that the overvoltage device can be reset to an initial state in which the overvoltage device can be tripped. With the electrically conductive connection between the poles of the voltage terminal, the voltage terminal can be short-circuited so that a voltage of the voltage terminal is reduced, in particular is almost 0 V, and a short-circuit current can flow through the first fuse circuit and the overvoltage protection circuit. If the current intensity falls below the minimum, the poles of the voltage terminal can be electrically separated and/or isolated from one another.

In one example, the second fuse circuit is adapted to interrupt the line current from flowing when a second current intensity limit value is reached by the line current intensity, wherein the second current intensity limit value is dependent on the electrical load.

In one example, the second fuse circuit comprises a plurality of voltage limit value switches, each of which is connected upstream of an electrical load, and wherein the respective voltage limit value switch is adapted to electrically connect the poles of the voltage terminal when a voltage limit value of a voltage dependent on the respective downstream electrical load is reached at the respective voltage limit value switch.

In particular, the overvoltage protection circuits can each be formed by a Zener diode. A connection for connecting a circuit can be downstream in respect to each Zener diode. The respective Zener diode can be adapted to become electrically conductive at a predetermined voltage and to switch the semiconductor switch, in particular a thyristor, accordingly. The respective predetermined voltage can depend on the permissible voltage of the respective circuit. Each Zener diode can therefore have a different voltage limit value in relation to the other Zener diodes, at which the Zener diode becomes electrically conductive. The Zener diodes can in particular be connected upstream of a plurality of electrical loads arranged in series in a cascade-like manner, wherein the voltage limit values do not necessarily become smaller, but rather being greater for electrical loads connected downstream.

In one example, the overvoltage protection circuit comprises a semiconductor switch which is electrically connected in parallel to the poles of the voltage terminal and has a control input, wherein the semiconductor switch is adapted to connect the poles of the voltage terminal in an electrically conductive manner with a control signal applied to the control input and when the current intensity value falls below the minimum value cancel the electrically conductive connection between the poles of the voltage terminal.

The semiconductor switch can have a switch input and a switch output, the switch input being connected to a first pole of the voltage terminal via the first fuse circuit and the switch output being connected to a second pole of the voltage terminal. With the control signal, the semiconductor switch can switch from a first switching state, in which the semiconductor switch connects the poles of the voltage terminal electrically isolated or with high resistance, to a second switching state, in which the poles of the voltage terminal are electrically connected to one another, in particular are connected with low resistance.

When the current intensity falls below the minimum, the semiconductor switch can switch from the second switching state to the first switching state independently or by means of a control signal at the control input. The overvoltage protection circuit can furthermore have a current sensor which is adapted to detect the current intensity of a current flowing through the semiconductor switch in order to switch the semiconductor switch.

In one example, the semiconductor switch is formed by a thyristor or a transistor. The thyristor can, for example, achieve the advantage that the poles of the voltage terminal are automatically electrically isolated when the current intensity value falls below the minimum value. The thyristor can be a switchable component which is non-conductive in the initial state and can be switched on by a current at the control input, in particular at a gate electrode. After switching on, the thyristor can be conductive even without current at the control input. The thyristor can switch off when the current intensity falls below a minimum value, for example a holding current.

Furthermore, the semiconductor switch can switch from the first switching state to the second switching state when a switch voltage limit value is exceeded, in particular even without a control signal being applied to the control input. A thyristor can trip overhead, for example, when a zero breakover voltage of the thyristor is reached. With the transistor, the advantage can be achieved that switching from the first switching state to the second switching state and vice versa can take place manually at any time.

In one example, the overvoltage protection circuit has a voltage limit switch with a switch input and a switch output, the voltage limit switch being connected downstream of the first fuse circuit via the switch input and being connected to the control input of the semiconductor switch via the switch output, and the voltage limit switch being adapted to provide the control signal when the first voltage limit value is reached by the voltage at the first fuse circuit at the switch output.

When the voltage limit value is reached, the voltage limit switch can switch from a non-conductive state to a conductive state in order to connect the control input to the first pole of the voltage terminal via the first fuse circuit. With the switch output, the voltage limit switch can also be connected to the second pole of the voltage terminal, in particular via a resistor. With this electrical connection, a current can flow through the voltage limit switch, which current can form the control signal for switching the semiconductor switch.

In one example, the voltage limit switch is formed by a Z-diode and/or by a unipolar overvoltage protection. When the first voltage limit value is reached, the Z-diode can switch from a blocking state to a conducting state, the Z-diode changing back from the conducting state to the blocking state when the voltage falls below the threshold value.

The unipolar overvoltage protection can, for example, be a suppressor diode with which a current pulse can be conducted past the electrical load. As a result, a voltage above the breakdown voltage of the suppressor diode, which could damage the electrical load, can be interrupted from being applied to the electrical load. Below the current intensity and/or voltage limit values, the electrical effect of the voltage limit value switch with a low leakage current and a low capacitance can be electrically neutral to the electrical load. The current of the pulse is routed past the electrical load by being connected in parallel. The Z-diode can be replaced by any voltage limit value circuit.

In one example, the overvoltage protection circuit comprises a resistor, which is connected downstream of the switch output of the voltage limit switch and is arranged with the voltage limit switch electrically parallel to the poles of the voltage terminal, and wherein the control input is connected to the switch output of the voltage limit switch and the resistor, and the resistor is formed to provide a control signal, in particular in the form of a part of the voltage at the voltage terminal, when the voltage limit switch is switched at the control input, in order to switch the semiconductor switch.

If the voltage limit switch, in particular the Z-diode, switches due to reaching the first voltage limit value, in the case of the Z-diode when the Zener voltage is reached, the voltage limit switch can change from a high-resistance state to a low-resistance state. In particular in comparison to the downstream resistor, the voltage limit switch in the low-ohmic state has a lower ohmic resistance than the downstream resistor. Accordingly, the voltage of the voltage terminal drops almost completely across the resistor, so that the voltage at the control input can change.

With the voltage change, the semiconductor switch can switch, which compared to the series circuit consisting of the voltage limit switch and the resistor can have a lower ohmic resistance, so that an electric current with the switching of the semiconductor switch mainly flows through the semiconductor switch and only to a lesser extent via the voltage limit switch and the resistance.

In one example, the first fuse circuit and the second fuse circuit each have an overcurrent protection fuse, in particular a fuse and/or a circuit breaker, the overcurrent protection fuse being adapted to disconnect the electrical connection between the voltage terminal and the electrical load when the first current intensity limit value or the second current intensity limit value is reached, or to disconnect after a predetermined time interval after reaching the first current intensity limit value or the second current intensity limit value.

The predetermined time interval can be determined by a trip delay of the respective fuse, in which a wire element of the fuse is heated and melted by the current flow. The trip delay of the overcurrent protection fuse in the first fuse circuit can be greater than the trip delay of the overcurrent protection fuse in the second fuse circuit. In particular, the first overcurrent protection fuse is used to subsequently disconnect the electrical connection between the voltage terminal and the electrical load after the semiconductor switch has switched. A line current with a current intensity above the first current intensity limit value, which trips the first overcurrent protection fuse, flows via the semiconductor switch and thus not to the electrical load.

A protection of the electrical load against a line current with a current intensity which could damage the electrical load can be implemented by the second overcurrent protection fuse. The second overcurrent protection fuse can therefore trip more quickly and at a lower current intensity than the first overcurrent protection fuse.

In one example, the second fuse circuit has a further voltage limit switch, which is connected downstream or upstream of the overcurrent protection fuse with the further switch input, and wherein the further switch output is connected to the control input, and the further voltage limit switch is formed when the second voltage limit is reached by a voltage, which is applied to the second fuse circuit, to provide a control signal at the further switch output for tripping the overvoltage protection circuit.

This has the advantage that even when the second voltage limit value is reached, a line current with a current intensity above the first current intensity limit value only flows through the first fuse circuit and the overvoltage protection circuit. The second overcurrent protection fuse can therefore advantageously not trip when the second voltage limit value is reached.

In one example, the further switch output is followed by a resistor, via which the further voltage limit switch can be connected to one pole of the voltage terminal. The voltage limit switch and the further voltage limit switch can both advantageously be connected upstream of the same resistor.

In one example, the overvoltage protection circuit is adapted to interrupt a voltage that is applied to the electrical load from increasing above the second voltage limit value of the further voltage limit value switch when the overvoltage protection circuit is tripped by means of the further voltage limit switch. Furthermore, a line current can be interrupted from flowing through the second fuse circuit to the electrical load, in particular above the second current intensity limit value. By tripping the overvoltage protection circuit by means of the further voltage limit switch, the poles of the voltage terminal can be short-circuited by the conducting semiconductor switch in order to interrupt a current flow to the electrical load.

In one example, the first protective circuit and/or the second protective circuit are adapted to interrupt an electrical connection between the voltage terminal and the electrical load when a short-circuit current flows through the overvoltage protection circuit, in order to interrupt the flow of a line current at a current intensity above the first current intensity limit value and/or above the second current intensity limit value to the electrical load.

The electrical connection can be interrupted by means of a blocking semiconductor element, a mechanical switching contact or by means of a defined melting of the overcurrent protection fuse. Accordingly, the electrical connection can be disconnected in a reversible manner or, in the case of defined melting, in an irreversible manner. After the first protective circuit and/or the second protective circuit has been tripped, manual intervention may be necessary in order to put the circuit back into operation. For example, it may be necessary to replace one of the overcurrent protection fuses and/or to remedy the cause of the overvoltage or the overcurrent.

In one example, the first fuse circuit and/or the second fuse circuit are adapted to detect a component and/or ambient temperature and, when the component and/or ambient temperature reaches a temperature limit, trip the overvoltage protection circuit and/or to interrupt a current to flow from the voltage terminal to the electrical load. This has the advantage that the electrical load can be protected from thermal loads.

In one example, the second fuse circuit is adapted to provide the electrical load with a reduced maximum electrical power compared to the composite comprising the first fuse circuit and the overvoltage protection circuit by limiting the line current intensity to the second current intensity limit value and limiting a voltage of the voltage terminal to the second voltage limit value.

In one example, the first fuse circuit and/or the overvoltage protection circuit is followed downstream by a power supply unit, the power supply unit being connected upstream of the second fuse circuit and being configured, to provide an increased or decreased voltage to the second fuse circuit in respect to the voltage of the voltage terminal.

BRIEF DESCRIPTION OF THE DRAWINGS

Further examples are explained with reference to the accompanying figures. They show.

DETAILED DESCRIPTION

Figure 1:
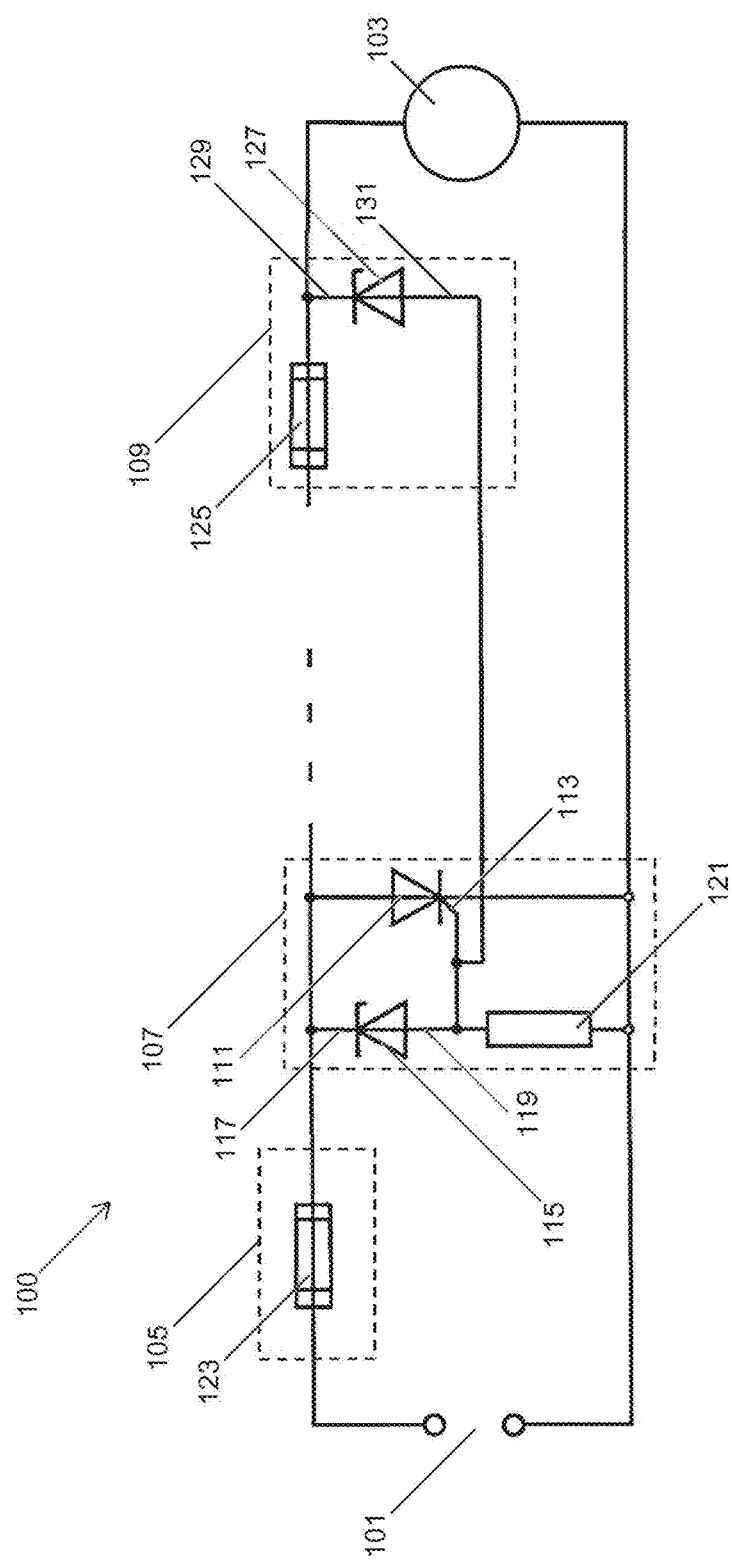
FIG. 1 shows an example of a protective device.

FIG. 1 shows a schematic representation of the protective device 100 for the overcurrent and overvoltage protected transmission of electrical energy from a voltage terminal 101 to an electrical load 103, the voltage terminal 101 having two poles. The protective device 100 comprises a first fuse circuit 105 which is adapted to interrupt the flow of a line current from the voltage terminal 101 to the electrical load 103 when a first current intensity limit value is reached by a line current intensity.

The protective device 100 further comprises an overvoltage protection circuit 107, which is connected downstream of the first fuse circuit 105 and is connected upstream of the electrical load 103. The overvoltage protection circuit 107 is adapted to connect the poles of the voltage terminal 101 in an electrically conductive manner when a first voltage limit value of a voltage at the first fuse circuit 105 is reached, in order to force a line current to trip the first fuse circuit 105 which reaches the first current intensity limit value.

Furthermore, the protective device 100 comprises a second fuse circuit 109, which is connected downstream of the overvoltage protection circuit 107 and upstream of the electrical load 103. The second fuse circuit 109 is adapted to interrupt the flow of a line current, when a second current intensity limit value is reached by the line current intensity. The second fuse circuit 109 is also adapted to connect the poles of the voltage terminal 101 in an electrically conductive manner when a second voltage limit value of a voltage which is applied to the second fuse circuit 109 is reached, the second current intensity limit value and the second voltage limit value are determined depending on a nominal voltage or a nominal current intensity of the electrical load 103.

The overvoltage protection circuit 107 comprises a thyristor 111, in particular a thyristor, which is connected electrically in parallel to the poles of the voltage terminal 101 and has a control input 113. The semiconductor switch 111 is adapted to connect the poles of the voltage terminal 101 in an electrically conductive manner with a control signal applied to the control input 113 and to interrupt the electrically conductive connection between the poles of the voltage terminal 101 when the line current intensity falls below the minimum current intensity value.

The overvoltage device 107 also comprises a voltage limit switch 115, in particular a Z-diode with a switch input 117 and a switch output 119. The voltage limit switch 115 is connected downstream of the first fuse circuit 105 via the switch input 117 and is connected via the switch output 119 to the control input 113 of the semiconductor switch 111. Furthermore, the voltage limit value switch 115 is adapted to provide the control signal at the switch output 119 when the first voltage limit value is reached by the voltage at the first fuse circuit 105.

The overvoltage protection circuit 107 furthermore comprises a resistor 121, which is connected downstream of the switch output 119 of the voltage limit switch 115 and is arranged with the voltage limit switch 115 electrically parallel to the poles of the voltage terminal 101. The control input 113 is connected to the switch output 119 of the voltage limit switch 115 and the resistor 121, the resistor 121 being adapted to provide a control signal, in particular in the form of part of the voltage at the voltage terminal 101, when the voltage limit switch 115 is switched at the control input 113 to switch the semiconductor switch 111.

The first fuse circuit 105 and the second fuse circuit 109 each have an overcurrent protection fuse 123, 125, in particular a fuse. The overcurrent protection fuse 123 is adapted to disconnect the electrical connection between the voltage terminal 101 and the electrical load 103 when the first current intensity limit value is reached or to disconnect it after a predetermined time interval after the first current intensity limit value has been reached. Correspondingly, the overcurrent protection fuse 125 is adapted to disconnect the electrical connection between the voltage terminal 101 and the electrical load 103 when the second current intensity limit value is reached, or after a predetermined time interval has elapsed after the first current intensity limit value or the second current intensity limit has been reached.

The second fuse circuit 109 has a further voltage limit switch 127 with a further switch input 129 and a further switch output 131, which is connected downstream of the overcurrent protection fuse 125 with the further switch input 129. In one example, the overcurrent protection fuse 125 is connected upstream of the further voltage limit switch 131, or the second fuse circuit 109 does not comprise the overcurrent protection fuse 125.

The further switch output 131 is connected to the control input 113, and the further voltage limit value switch 127 is adapted to provide a control signal to trip the overvoltage protection circuit 107 at the further switch output 131 when the second voltage limit value is reached by a voltage at the further voltage limit value switch 127, wherein the second voltage limit value is determined in dependence of a nominal voltage of the electrical load 103.

The further switch output 131 is connected to the control signal input 113, the switch output 119 and the resistor 121. Accordingly, the further voltage limit value switch 127 can trip the semiconductor switch 111 in a similar way to the voltage limit value switch 115. When the voltage limit switch 115 or the further voltage limit switch 127 is switched, a part of a voltage of the voltage terminal 101 at the resistor 121 can drop. This voltage can be applied as a control signal to the control input 113 of the semiconductor switch 111. Before the semiconductor switch 111 is switched, a current can flow via the further voltage limit value switch 127 and via the resistor 121.

Figure 2:
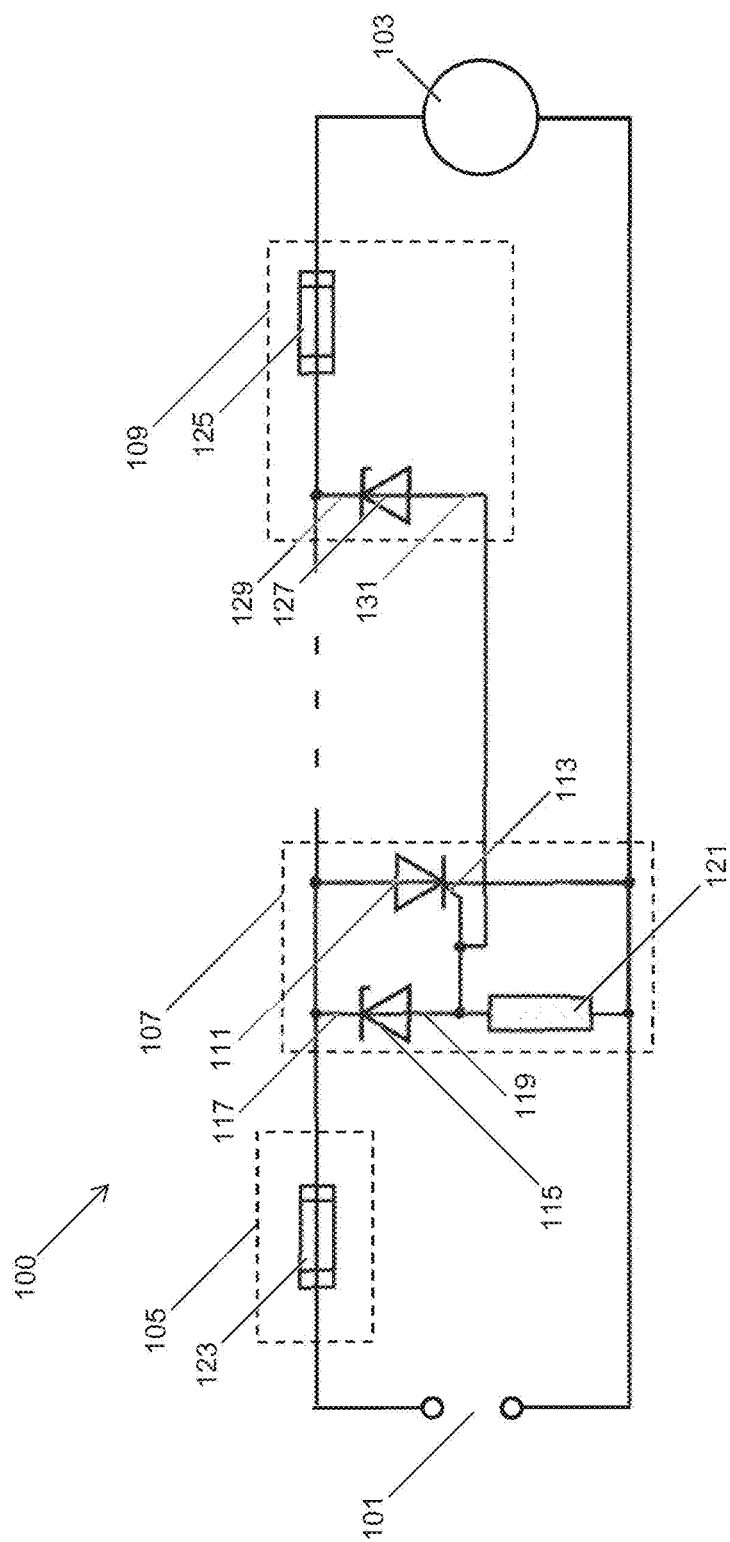
FIG. 2 shows an example of a protective device.

FIG. 2 shows a schematic representation of the protective device 100 for the overcurrent and overvoltage protected transmission of electrical energy from a voltage terminal 101 to an electrical load 103, the voltage terminal 101 having two poles. The protective device 100 comprises a first fuse circuit 105 which is adapted to interrupt the flow of a line current from the voltage terminal 101 to the electrical load 103 when a first current intensity limit value is reached by a line current intensity.

The protective device 100 further comprises an overvoltage protection circuit 107, which is connected downstream of the first fuse circuit 105 and is connected upstream of the electrical load 103. The overvoltage protection circuit 107 is adapted to connect the poles of the voltage terminal 101 in an electrically conductive manner when a first voltage limit value of a voltage at the first fuse circuit 105 is reached, in order to force a line current to trip the first fuse circuit 105 which reaches the first current intensity limit value.

Furthermore, the protective device 100 comprises a second fuse circuit 109, which is connected downstream of the overvoltage protection circuit 107 and upstream of the electrical load 103. The second fuse circuit 109 is adapted to interrupt the flow of a line current when a second current intensity limit value is reached by the line current intensity. The second fuse circuit 109 is also adapted to connect the poles of the voltage terminal 101 in an electrically conductive manner when a second voltage limit value of a voltage which is applied to the second fuse circuit 109 is reached, the second current intensity limit value and the second voltage limit value are determined each depending on a nominal voltage or a nominal current intensity of the electrical load 103.

The second fuse circuit 109 has a further voltage limit switch 127 with a further switch input 129 and a further switch output 131, which is connected upstream of the overcurrent protection fuse 125 with the further switch input 129.

Figure 3:
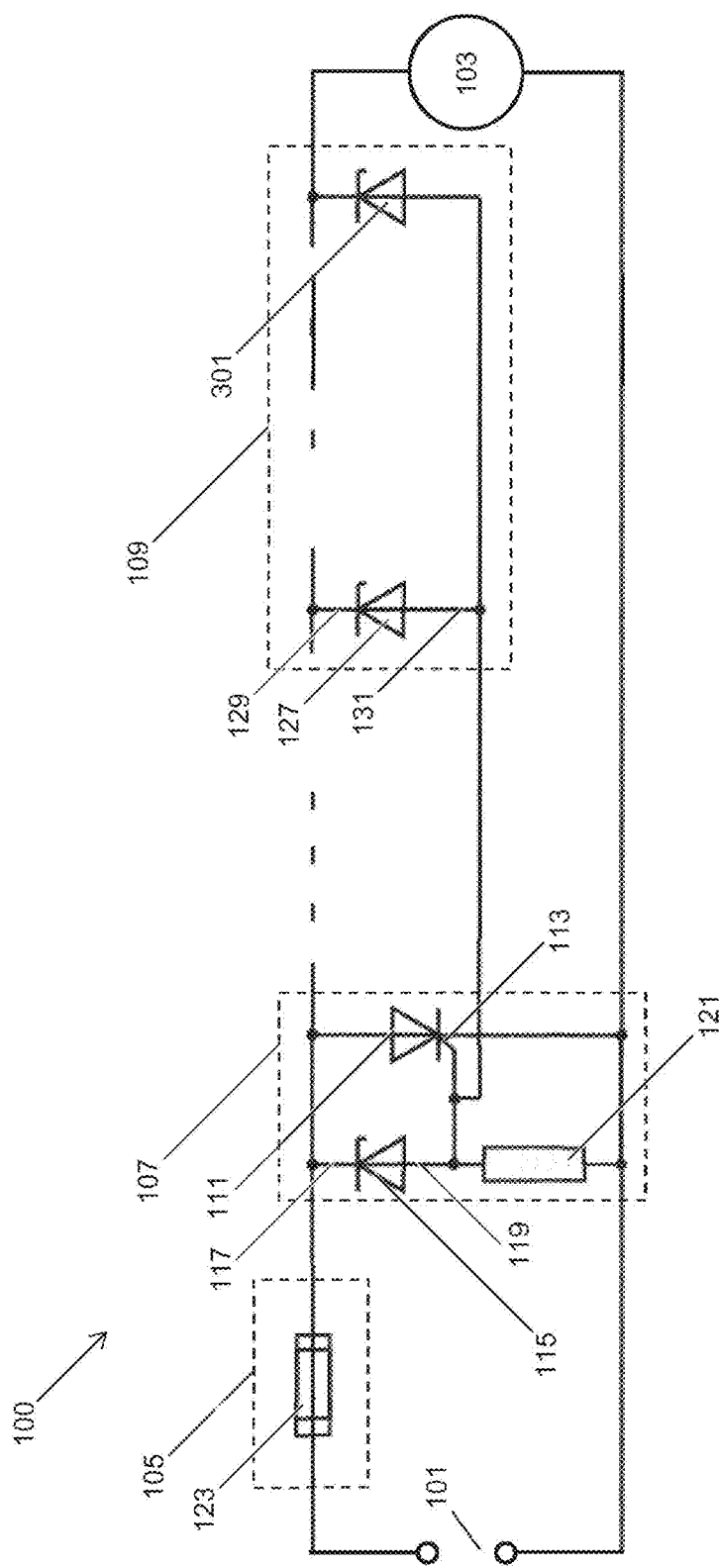
FIG. 3 shows an example of a protective device.

FIG. 3 shows a schematic representation of the protective device 100. The second fuse circuit 109 comprises a plurality of voltage limit value switches 127, 301, which are each connected upstream of an electrical load 103, and the respective voltage limit value switch 127, 301 is adapted to connect the poles of the voltage terminal in an electrically conductive manner when a voltage limit value of a voltage dependent on the respective downstream electrical loads 103 is reached at the respective voltage limit value switches 127, 301.

LIST OF REFERENCE SYMBOLS 100 protective device
101 voltage terminal
103 electrical load
105 first fuse circuit
107 overvoltage protection circuit
109 second fuse circuit
111 semiconductor switch
113 control input
115 voltage limit switch
117 switch input
119 switch output
121 resistance
123 overcurrent protection fuse
125 overcurrent protection fuse
127 voltage limit switch
129 switch input
131 switch output
301 voltage limit switch

What is claimed is:

1. A protective device for overcurrent and overvoltage protected transmission of electrical energy from a voltage terminal to an electrical load wherein the voltage terminal has two poles, comprising:
   a first fuse circuit adapted to interrupt a flow of a line current from the voltage terminal to the electrical load when an intensity of the line current intensity reaches a first current intensity limit value;
   an overvoltage protection circuit connected downstream of the first fuse circuit and upstream of the electrical load, wherein the overvoltage protection circuit is adapted to connect the poles of the voltage terminal in an electrically conductive manner, when a first voltage limit value of a voltage is reached on the first fuse circuit, to force the line current to reach the first current intensity limit value; and
   a second fuse circuit which is connected downstream of the overvoltage protection circuit and upstream of the electrical load wherein the second fuse circuit is also adapted to activate the overvoltage protection circuit when a second voltage limit value of a voltage on the second fuse circuit is reached in order to connect the poles of the voltage terminal in an electrically conductive manner, and wherein the second voltage limit value is based at least in part on a nominal voltage of the electrical load.

2. The protective device according to claim 1, wherein the second fuse circuit is adapted to interrupt the flow of the line current when a second current intensity limit value is reached by the line current, and wherein the second current intensity limit value is based at least in part on a nominal current intensity of the electrical load.

3. The protective device according to claim 1, wherein the second fuse circuit comprises a plurality of voltage limit value switches which are each connected upstream of the electrical load, and wherein the respective voltage limit value switch is adapted to control the overvoltage protection circuit when a respective voltage limit value is reached at the respective voltage limit value switch, wherein the respective voltage limit value is based at least in part on the nominal voltage of the electrical load in order to connect the poles of the voltage terminal in an electrically conductive manner.

4. The protective device according to claim 1, wherein the overvoltage protection circuit is adapted to interrupt an electrically conductive connection of the poles of the voltage terminal when the intensity of the line current flowing through the overvoltage protection circuit falls below a minimum level.

5. The protective device according to claim 1, wherein the overvoltage protection circuit comprises a semiconductor switch which is electrically connected in parallel to the poles of the voltage terminal and comprises a control input, wherein the semiconductor switch is adapted to connect the poles of the voltage terminal in an electrically conductive manner with a control signal applied to the control input and to interrupt an electrically conductive connection between the poles of the voltage terminal when the intensity of the line current falls below a minimum level.

6. The protective device according to claim 5, wherein the semiconductor switch comprises a thyristor or a transistor.

7. The protective device according to claim 5, wherein the overvoltage protection circuit has a voltage limit switch comprising a switch input and a switch output, and wherein the voltage limit switch is connected downstream of the first fuse circuit via the switch input and is connected to the control input of the semiconductor switch via the switch output, and wherein the voltage limit switch is configured to provide the control signal at the switch output when the voltage at the first fuse circuit reaches the first voltage limit value.

8. The protective device according to claim 7, wherein the voltage limit switch comprises one or more of: a Z-diode or a unipolar overvoltage protection switch.

9. The protective device according to claim 7, wherein the overvoltage protection circuit comprises a resistor which is connected downstream of the switch output of the voltage limit switch and is arranged electrically parallel to the poles with the voltage limit switch of the voltage terminal, and wherein the control input is connected to the switch output of the voltage limit switch and the resistor, and wherein the resistor is adapted to provide the control signal at the control input to switch the semiconductor switch when the voltage limit switch is switched, the control signal comprising a part of the voltage at the voltage terminal.

10. The protective device according to claim 1, wherein each of the first fuse circuit and the second fuse circuit comprises an overcurrent protection fuse or circuit breaker, wherein the overcurrent protection fuse or circuit breaker is adapted to disconnect an electrical connection between the voltage terminal and the electrical load when the first current intensity limit value or a second current intensity limit value is reached, or after a predetermined time interval has elapsed after the first current intensity limit value or the second current intensity limit value has been reached.

11. The protective device according to claim 10, wherein the second fuse circuit comprises a further voltage limit switch with a further switch input and a further switch output, wherein the further switch input of the overcurrent protection fuse is connected downstream or upstream with the further voltage limit switch, and wherein the further switch output is connected to a control input and the further voltage limit switch is adapted to provide a control signal to trip the overvoltage protection circuit at the further switch output when the second voltage limit value is reached by the voltage on the second fuse circuit.

12. The protective device according to claim 11, wherein the further switch output is followed by a resistor via which the further voltage limit switch is configured to connect to one pole of the voltage terminal.

13. The protective device according to claim 12, wherein the overvoltage protection circuit is adapted to prevent a voltage that is applied to the electrical load from increasing above the second voltage limit value of the further voltage limit switch when the overvoltage protection circuit is tripped via the further voltage limit switch.

14. The protective device according to claim 1, wherein one or more of the first fuse circuit or the second fuse circuit is adapted to allow the line current to flow with a current intensity above the first current intensity limit value or above a second current intensity limit value to interrupt the electrical load.

15. The protective device according to claim 1, wherein one or more of the first fuse circuit or the second fuse circuit is adapted to detect a component temperature or an ambient temperature, and when a temperature limit value is reached by the component temperature or the ambient temperature, to trip the overvoltage protection circuit or interrupt a current from flowing from the voltage terminal to the electrical load.

16. The protective device according to claim 1, wherein the second fuse circuit is adapted to provide to the electrical load a reduced maximum electrical power, wherein the reduced maximum electrical power is reduced with respect to a composite of the first fuse circuit and the overvoltage protection circuit, via a limitation of the intensity of the line current to a second current intensity limit value and a limitation of the voltage applied to the second fuse circuit to the second voltage limit value.

17. The protective device according to claim 1, wherein a power supply is connected downstream of the first fuse circuit or the overvoltage protection circuit, wherein the power supply is connected upstream of the second fuse circuit and is adapted to increase or decrease the voltage applied to the second fuse circuit with respect to a voltage of the voltage terminal.

* * * * *